United States Patent [19]

Rune

[11] Patent Number: 5,740,535
[45] Date of Patent: Apr. 14, 1998

[54] ADAPTIVE MOBILE STATION PRESENCE VERIFICATION

[75] Inventor: Göran Rune, Linköping, Sweden

[73] Assignee: Telefonaktiebolaget L M Ericsson (publ), Stockholm, Sweden

[21] Appl. No.: 587,737

[22] Filed: Jan. 19, 1996

[51] Int. Cl.⁶ .................................................. H04Q 7/00
[52] U.S. Cl. .................................... 455/437; 455/436
[58] Field of Search .............................. 455/436, 439, 455/438, 440, 424, 444

[56] References Cited

U.S. PATENT DOCUMENTS

| | | | |
|---|---|---|---|
| 4,737,978 | 4/1988 | Burke et al. | 455/438 |
| 4,747,101 | 5/1988 | Akaiwa et al. | 370/95 |
| 5,093,927 | 3/1992 | Shanley | 455/34 |
| 5,123,112 | 6/1992 | Choate | 455/56.1 |
| 5,189,734 | 2/1993 | Bailey et al. | 455/33.2 |
| 5,200,957 | 4/1993 | Dahlin | 370/100 |
| 5,212,804 | 5/1993 | Choate | 455/33.1 |
| 5,239,682 | 8/1993 | Strawczynski et al. | 455/54.1 |
| 5,396,647 | 3/1995 | Thompson et al. | 455/33.2 |
| 5,428,816 | 6/1995 | Barnett et al. | 455/33.2 |
| 5,448,761 | 9/1995 | Ushirokawa | 455/63 |
| 5,465,289 | 11/1995 | Kennedy, Jr. | 455/424 |
| 5,542,097 | 7/1996 | Ward et al. | 455/437 |
| 5,623,535 | 4/1997 | Leung et al. | 455/444 |

FOREIGN PATENT DOCUMENTS

| | | |
|---|---|---|
| 0 406 186 A2 | 2/1991 | European Pat. Off. |
| WO 92/17953 | 10/1992 | WIPO |
| WO 93/12623 | 6/1993 | WIPO |
| WO 95/28808 | 10/1995 | WIPO |

*Primary Examiner*—William Cumming
*Assistant Examiner*—Myron K. Wyche
*Attorney, Agent, or Firm*—Jenkens & Gilchrist P.C.

[57] ABSTRACT

A method and apparatus for adaptive mobile station presence verification in a cellular system. Mobile station presence verification is performed only for selected requested handoffs from a first base station to a second base station, where the selected requested handoffs are chosen based on a rate of mobile station presence verifications per requested handoffs from the first base station to the second base station, that is adaptively changed as handoffs occur. In an embodiment of the invention, the rate of mobile station presence verifications per requested handoffs from the first base station to the second base station is adaptively changed based on the rates of unsuccessful verifications per verification attempts and, the rate of unsuccessful handoffs per requested handoff attempts, from the first base station to the second base station.

9 Claims, 5 Drawing Sheets

ADAPTIVE MOBILE STATION PRESENCE VERIFICATION

BACKGROUND OF THE INVENTION

1. Field of the Invention

This invention relates to cellular telecommunications systems, and, more particularly, to a method and apparatus for adaptive mobile station presence verification during handoff in a cellular telecommunications system.

2. History of the Prior Art

In a cellular mobile telecommunications system the user of a mobile station communicates with the system through a radio interface while moving about the geographic coverage area of the system. The radio interface between the mobile station and system is implemented by providing base stations dispersed throughout the coverage area of the system, each capable of radio communication with the mobile stations operating within the system. In a typical mobile telecommunications system each base station of the system controls communications within a certain geographic coverage area ideally represented by a hexagonal shape termed a cell, and a mobile station which is located within a particular cell communicates with the base station controlling that cell. When a call is initiated by the user of a mobile station, or received at the system for a mobile station, the call is set up on radio channels assigned to the base station controlling the cell in which the mobile station is located. If the mobile station moves away from the original cell in which the call was setup and the signal strength on the radio channels of the original cell weakens, the system will affect transfer of the call to radio channels of a base station controlling a neighboring cell into which the mobile station moves. As the mobile station user continues to move throughout the system, control of the call may be transferred from the neighboring cell to another cell. This transfer of the call from cell to cell is termed handover or handoff.

Handoff can only be effective if the call is transferred to radio channels that provide adequate signal strength for two way communications. This requires sufficient signal strength at both the receiver of the mobile station and receiver of the base station to which handoff is made. The signals must also be sufficiently strong in relation to any noise or interference that is present in the network. For effective handoff it is necessary that some sort of signal strength or interference level measurement process be used to determine which of the neighboring cell is to be selected for handoff. In existing systems the measurement process is done by either making measurements at the receivers of neighboring base stations on signals transmitted from the mobile station, or by making measurements at the receiver of the mobile station on signals transmitted from neighboring base stations. The latter method requires that the mobile station be a part of the measurement process used to select a cell for handoff.

In the most prevalent present day digital cellular telecommunications systems, the time division multiple access (TDMA) signal transmission mode is used. In TDMA, communications between a base station and a particular mobile station are transmitted on radio channels that also may be used for communications between the same base station and other mobile stations. The communications are carried out through data or digitized voice signals that are transmitted as bursts in time slots that are time multiplexed on the radio channels. Each mobile station in communication with a base station is assigned a time slot on both the reverse radio channel and forward radio channels. The assigned time slots are unique to each mobile station, so communications between different mobiles do not interfere with each other.

The handoff process is known as mobile assisted handoff (MAHO). In MAHO, handoff measurement is done at the mobile station during the times when the mobile station is neither transmitting in the assigned reverse channel time slot nor receiving in the assigned forward channel time slot. During the times between signal bursts in an ongoing call, the mobile station periodically monitors radio channels of each base station located in close proximity. The control channel of each neighboring base station is typically used as the measurement channel. For each ongoing call the identities of the measurement channels are contained in a neighbor cell list for the cell in which the call is proceeding. The neighbor cell list for each cell is typically transmitted to a mobile station when the mobile station registers in that cell. In addition to measuring the measurement channels of neighboring base stations, the mobile station also measures the received signal strength on the current channel on which the call is proceeding. The mobile station measures the received signal strength on these radio channels and transmits the measurement results to the current base station. The current base station then forwards these measurement results to the MSC. If the received signal strength on the current channel falls below the received signal strength on a measurement channel of a neighboring cell, the MSC initiates handoff to that neighboring cell.

A MAHO process is used in systems operating according to the IS-54B EIA/TIA Cellular System Dual-Mode Mobile station—Base Station Compatibility Standard (IS-54B) and the IS-136 EIA/TIA Cellular System Dual-Mode Mobile Station—Base Station Compatibility Standard (IS-136). An IS-136 system is essentially an IS-54B with the addition of a digital control channel. The MAHO process is also used in the proposed D-AMPS 1900 system, which is a version of IS-136 scaled up from the 800 MHZ range to the 1900 MHZ range, and, in the Japanese digital cellular telecommunications system (PDC).

When MAHO measurements are made on the channel frequencies specified in the neighbor cell list of the cell in which a mobile station is located, co-channel interference may affect the measurement. Co-channel interference results from the reuse of identical frequencies at different base stations of the system. While patterns of base station frequency reuse are designed so that only distantly located cells will reuse the same frequencies it is possible that, because of RF propagating anomalies or otherwise, transmissions will propagate strongly to a mobile station from base stations other than the base stations that were used to create the MAHO neighbor cell list. The system may then erroneously determine that a strongly received channel was received from one of the neighbor cells. In this situation, the interfering co-channel transmissions will cause measurements to indicate that a neighbor cell contained in the neighbor cell list is the best candidate for handoff even though the neighbor cell is not actually an acceptable candidate.

The occurrence of these effects of co-channel interference on MAHO are not uncommon. In conventional cellular systems various methods have been devised to prevent the erroneous choice of handoff candidates caused by co-channel interference.

In the GSM system, for example, a base station identity code (BSIC) is transmitted on all control channels that uniquely identifies the transmitting base station within the system. For MAHO purposes, the mobile station constantly updates a list of the six strongest control channel frequencies and their identities. This list is used for cell reselection in the handoff process.

When it is necessary to report MAHO measurements to the system in GSM, the mobile station transmits the power level measurements of the six strongest received control channel frequencies along with the BSIC associated with the channels on which the signal strengths were measured. In GSM therefore, the system has an indication of the base station identity that is associated with the MAHO measurements in the measurement results transmitted to the current base station. This enables a determination to be made by the network that the mobile station has not measured signal strength on a co-channel interferer instead of the target base station.

In IS-54, IS-136, D-AMPS 1900 and PDC type systems, no means is provided for verifying that a MAHO signal strength measurement made on a particular channel frequency was actually received from the base station with which that particular channel frequency is associated in the neighbor cell list. Therefore, in order to prevent erroneous target base station selection for handoff in these systems, a mobile station presence verification is performed in which the system verifies that the target base station for handoff is capable of receiving a transmission from the mobile station.

In the mobile station presence verification process the base station is instructed to tune to a frequency on which the mobile station is transmitting. The system then verifies that the target base station can receive the mobile station transmissions. If the base station can receive the mobile station transmissions, the mobile station presence in or near the candidate cell is considered verified and a handoff is attempted. If, however, the base station does not receive the mobile station transmissions, no handoff is attempted, and, another target base station is selected.

The mobile station presence verification process requires either a separate receiver or a transceiver within each system base station. This additional circuitry costs extra money, requires additional space and results in increased signaling traffic within the cellular system that reduces capacity for the operators.

SUMMARY OF THE INVENTION

The present invention provides a method and system for adaptive mobile station presence verification in a mobile cellular telecommunications system. In the method and system, mobile station presence verification is not performed for all occurrences of handoff in the cellular system as in conventional systems. As compared to conventional systems in which mobile station presence verification is performed for every occurrence of handoff, the invention reduces the amount of system handoff resources necessary to perform mobile station presence verification. The invention also reduces system signaling traffic that is necessary for performing mobile station presence verification.

In the method and system of the invention, mobile station presence verification is performed only for selected handoffs between a first base station and a second base station, based on a rate of mobile station presence verifications per requested handoff from the first base station to the second base station. The rate of mobile station presence verifications is adaptively changed as handoffs from the first base station and second base station occur.

In an embodiment of the invention, the requested rate of mobile station presence verifications per requested handoff is adaptively changed based on ongoing calculations of the rates of unsuccessful verifications per verification attempt and, the rate of unsuccessful handoffs per handoff attempt, from the first base station to the second base station.

When mobile assisted handoff measurements made while a mobile station is under control of a first base station indicates that a second base station is a target base station, a determination is made as to whether a mobile station presence verification is to be performed for this handoff. The determination is made based on a rate of mobile station presence verifications per requested handoff from the first base station to the second base station. For example, mobile station presence verification may be performed at a rate of one out of every two requested handoffs. If it is determined that a mobile station presence verification is to be performed, a verification attempt is made. If it is determined that a mobile station presence verification is not to be performed, a handoff attempt is performed without a verification.

The rate of unsuccessful mobile station presence verifications per number of verification attempt and, rate of unsuccessful handoffs per handoff attempts is calculated on an ongoing basis, as handoff attempts occur. The rate of mobile station presence verifications per requested handoffs from the first base station to the second base station is recalculated on a predetermined basis, which may be on a time basis or based on the number of requested handoffs over a predetermined period of time, from the recalculated rate of unsuccessful mobile station presence verifications and recalculated rate unsuccessful handoff attempts.

DETAILED DESCRIPTION

Figure 1:
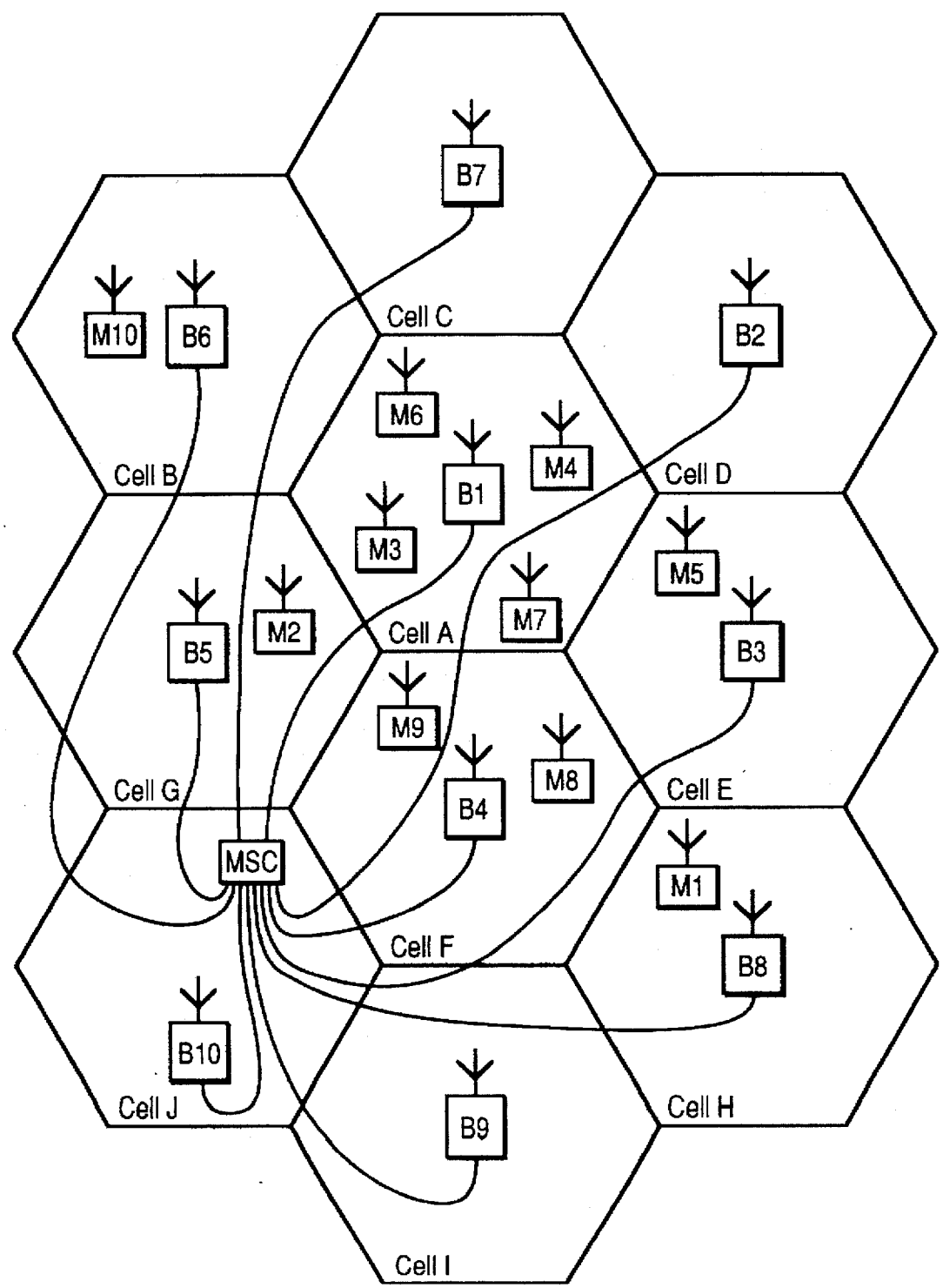
FIG. 1 shows a portion of a cellular radio communication system of the type to which the present invention generally pertains.

Referring to FIG. 1, there is shown a portion of a cellular radio communication system of the type to which the present invention generally pertains. In FIG. 1, an arbitrary geographic area may be divided into a plurality of contiguous radio coverage areas, or cells Cell A-Cell J. While the system of FIG. 1 is illustratively shown to include only ten cells, it should be clearly understood that in practice, the number of cells will be much larger.

Associated with and located within each of Cell A-Cell J is a base station designated as a corresponding one of a plurality of base stations B1–B10. Each of the base stations B1–B10 includes a transmitter, a receiver, and a base station controller as are well known in the art. In FIG. 1, the base stations B1–B10 are illustratively located at the center of each of Cell A-Cell J, respectively, and are equipped with omni-directional antennas. However, in other configurations of the cellular radio system, the base stations B1–B10 may be located near the periphery, or otherwise away from the center of Cell A-Cell J and may illuminate Cell A-Cell J with radio signals either omni-directionally or directionally. Therefore, the representation of the cellular radio system of FIG. 1 is for purposes of illustration only and is not intended as a limitation on the possible implementations of the cellular radio system within which the present invention is implemented.

With continuing reference to FIG. 1, a plurality of mobile stations M1–M10 may be found within Cell A-Cell J. Each of the mobile stations M1–M10 includes a transmitter, a receiver, and a mobile station controller as are well known in the art. Again, only ten mobile stations are shown in FIG. 1 but it should be understood that the actual number of mobile stations will be much larger in practice and will invariably greatly exceed the number of base stations. Moreover, while none of the mobile stations M1–M10 may be found in some of Cell A-Cell J, the presence or absence of the mobile stations M1–M10 in any particular one of Cell A-Cell J should be understood to depend in practice on the individual desires of the mobile stations M1–M10 who may roam from one location in the cell to another or from one cell to an adjacent cell or neighboring cell, and even from one cellular radio system served by an MSC to another such system.

Each of the mobile stations M1–M10 is capable of initiating or receiving a telephone call through one or more of the base stations B1–B10 and a mobile station switching center (MSC). A mobile station switching center (MSC) is connected by communication links, e.g., cables, to each of the illustrative base stations B1–B10 and to the fixed public switched telephone network (PSTN), not shown, or a similar fixed network which may include an integrated services digital network (ISDN) facility. The relevant connections between the mobile station switching center (MSC) and the base stations B1–B10, or between the mobile station switching center (MSC) and the PSTN or ISDN, are not completely shown in FIG. 1 but are well known to those of ordinary skill in the art. Similarly, it is also known to include more than one mobile station switching center in a cellular radio system and to connect each additional mobile station switching center to a different group of base stations and to other mobile station switching centers via cable or radio links.

Each MSC may control in a system the administration of communication between each of the base stations B1–B10 and the mobile stations M1–M10 in communication with it. As a mobile station roams about the system, the mobile station registers its location with the system through the base stations that control the area in which the mobile station is located. When the mobile station telecommunications system receives a call addressed to a particular mobile station, a paging message addressed to that mobile station is broadcast on control channels of the base stations which control the area in which the mobile station is believed to be located. Upon receiving the paging message addressed to it, the mobile station sends a page response to the base station. The process is then initiated to create the call connection. The MSC controls the paging of a mobile station believed to be in the geographic area served by its base stations B1–B10 in response to the receipt of a call for that mobile station, the assignment of radio channels to a mobile station by a base station upon receipt of a page response from the mobile station, as well as the handoff communications with a mobile station from one base station to another in response to the mobile station traveling through the system, from cell to cell, while communication is in progress.

Each of Cell A-Cell J is allocated a plurality of voice or speech channels and at least one control channel, such as an analog control channel (ACCH) or a digital control channel (DCCH). The control channel is used to control or supervise the operation of mobile stations by means of information transmitted to and received from those units. Such information may include call originations, page signals, page response signals, location registration signals and voice channel assignments.

The present invention involves implementation of a method and system for adaptive mobile station presence verification for handoff in a cellular system similar to that shown in FIG. 1.

In an embodiment of the invention, the method and system is implemented into a cellular system similar to that as shown in FIG. 1 that operates according to the IS-136 Standard.

Figure 2:
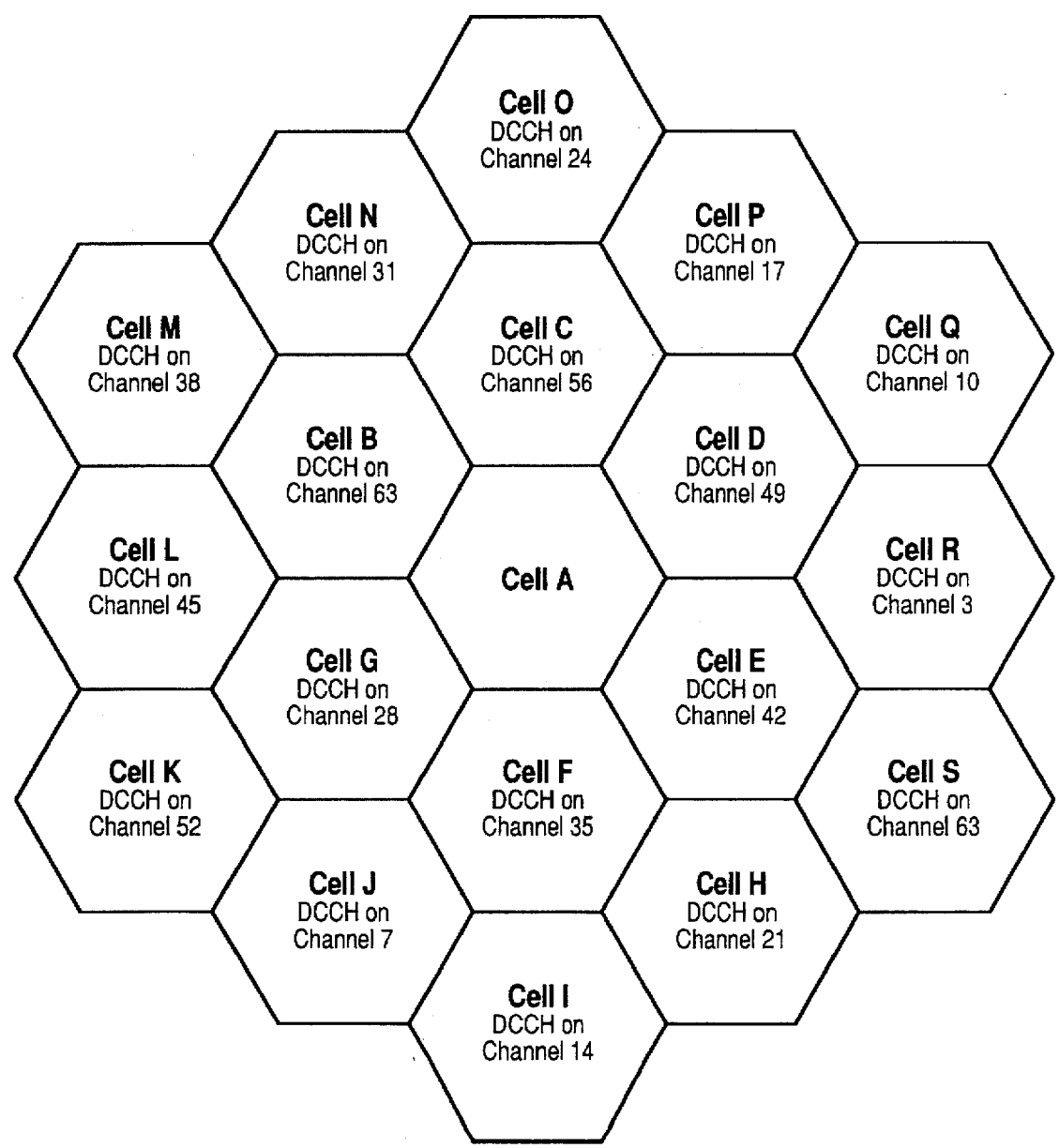
FIG. 2 shows the cells of the system shown in FIG. 1 with additional cells.

Referring now to FIG. 2, therein are shown cells Cell A-Cell J (also shown in FIG. 1) with additional neighboring cells Cell K-Cell S, that also comprise a portion of the same cellular system. Each of Cell K-Cell S may be configured identically to Cell A-Cell J as shown in FIG. 1, with a base station (not shown) located in each cell and Cell K-Cell S being controlled by one or more MSCs (not shown). In FIG. 2, Cell A is located in the center of the collection of Cell B-Cell S. Each of Cell B-Cell S has indicated within it an assigned DCCH channel number. The DCCH channel number assignments are conventionally fixed for an IS-136 cellular system. In FIG. 2, it can be seen that Cell S and Cell B are both using a DCCH on channel 63. This may be because of various reasons such as, that the system operator has allocated only 18 channels for DCCH use.

The handoff may be done by the method of mobile assisted handoff (MAHO) specified in commonly assigned U.S. Pat. No. 5,200,957 to Dahlin, which is hereby incorporated by reference. During the procedure for call setup on digital communication channel, the base station informs the mobile station of radio channel frequency and also of a time slot that identifies the time slot to be used and a digital voice color code (DVCC). During the call setup procedure, the base station also informs the mobile station of a plurality of DCCH channels, the signal strength of which are to be measured by the mobile for handoff purposes. This plurality of DCCH channels are the DCCH channels of cells which comprise the neighbor cell list. As a mobile station involved in the ongoing cell moves among Cell A-Cell S of FIG. 2, the system will handoff control of call communications from cell to cell. Depending upon the movement of the mobile station, as well as other circumstances, a new plurality of DCCH channels will be selected and the corresponding neighbor cell list transmitted to the mobile station from the responsible base station during the course of the connection. During the course of the connection the mobile station measures the signal strength of signals on the given plurality of DCCH channels. Measurements are done during time slots not used by the digital communication channel.

The mobile station also measures signal strength on the digital communication channel used for the established connection and the bit error rate on the established connection. The mobile station transmits results of its measurements, preferably averaged, frequently to the base station.

The base station also measures signal strength on the digital communication channel used for the established connection and the bit error rate on the established connection. The base station processes and analyzes the results of its own measurements and the measurements of the mobile station for comparison with handoff criteria. When, according to the results and criteria, a handoff is desired, the base station informs the mobile switching center sending a handoff request that indicates at least one target base station assumed suitable for taking over the responsibility for the communication with the mobile. In the embodiment of the invention, the mobile switching center is informed of one target base station. However, one skilled in the art will realize that it is possible to inform the mobile switching center of a plurality of target base stations and that the MSC may choose one of the target base stations based on criteria, such as, call traffic within the target base stations.

Once the target base stations have been determined, the adaptive mobile station presence verification of the invention is invoked. Each requested handoff for a target base station involves at least one of the following steps:

verification attempt (if determined necessary by adaptive verification process);

determination of verification results (if verification attempt);

handoff attempt (if no verification attempt or if successful verification attempt);

determination of handoff results (if handoff attempt).

When a verification is attempted, the mobile switching center requests the target base station to measure signal strength on a radio channel in the time slot used by the mobile for the established connection with the present base station. The mobile switching center also informs the target base station on the digital color code used by the mobile station.

The target base station tunes a receiver to the radio channel indicated by the mobile switching center and uses the time slot identifier of the indicated time slot for burst synchronization. The target base station checks the appearance of the digital color code indicated by the mobile switching center and measures the signal strength of the burst signal provided the digital color code is correct. The target base station then transmits the results of the signal strength measurement to the mobile switching center. The target base station also informs the mobile switching center on the result of the checking of the appearance of the digital color code, i.e., whether the digital color code appeared in the burst in the time slot of the radio channel.

The mobile switching center determines whether handoff to the target base station should be performed, i.e., taking the results of the signal strength measurements of the target base station into account as other circumstances, whether the verification was successful, e.g., traffic load.

Figure 3:
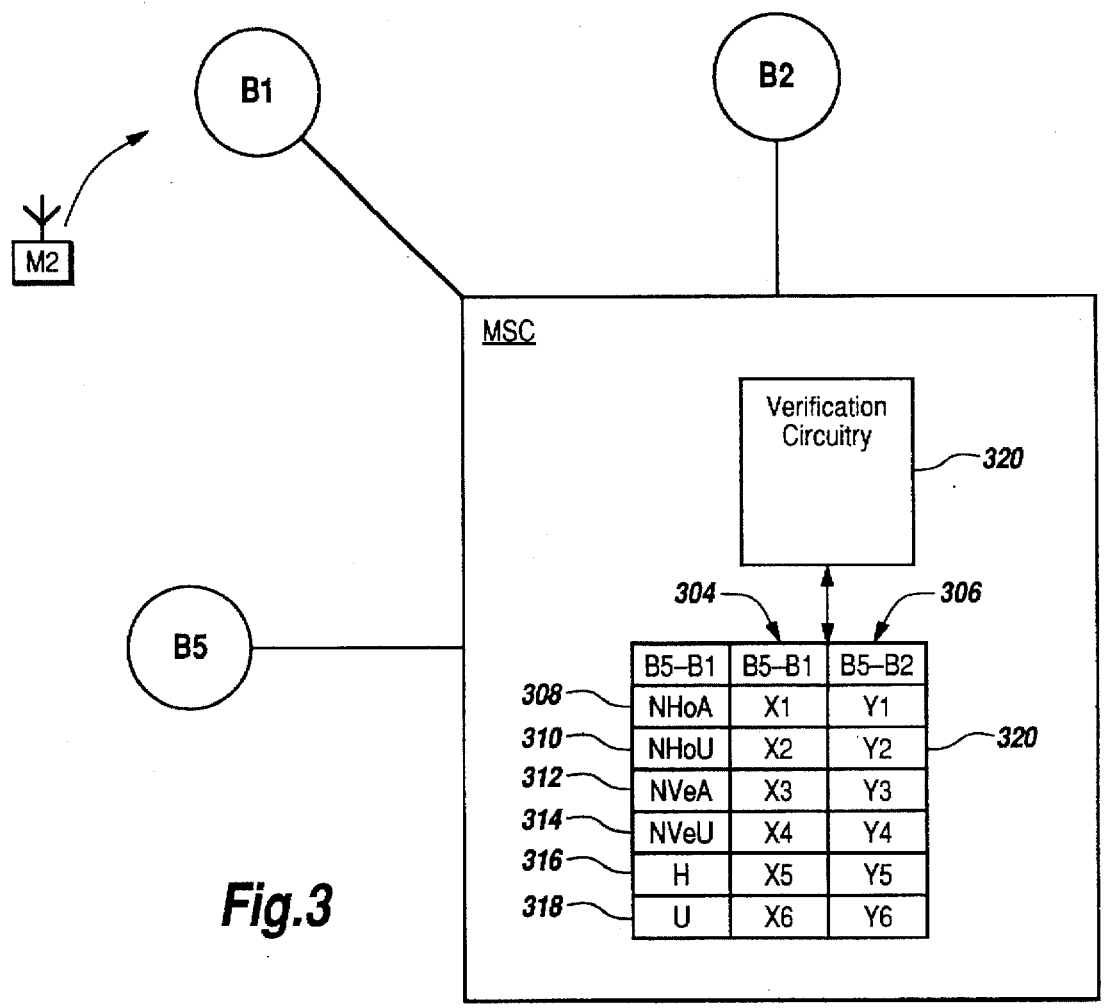
FIG. 3 shows an apparatus for performing adaptive mobile station presence verification according to an embodiment of the invention.

Referring now to FIG. 3, therein is shown an apparatus for performing adaptive mobile station presence verification according to the embodiment of the invention. In the embodiment of the invention shown in FIG. 3, the processing for the adaptive mobile station presence verification process is performed within the mobile switching center (MSC). FIG. 3 shows the apparatus which comprises verification processor 300 and database 320, implemented in the MSC of FIG. 1. Also shown are base stations B1, B2 and B5, and mobile station M2, of FIG. 1.

Database 320 includes a plurality of each of a number of adaptive mobile station presence verification fields 308–318. The adaptive mobile station presence verification fields include a number of handoff attempts ($NH_oA$) field 308, a number of unsuccessful handoff attempts ($NH_oU$) field 310, a number of verification attempts ($NV_eA$) field 312, a number of unsuccessful verification attempts ($NV_eU$) field 314, a rate of unsuccessful handoffs H field 316 and, a rate of unsuccessful verifications V field 318. Database 320 includes a plurality of each of data fields 308–318, one for each possible direction of handoff between base stations (serving base station to target base station) under the control of the MSC. For example, values $x_1$–$x_6$ of column 304 (labeled B5-B1) represent the values of data fields 308–318, respectively, for handoffs and verifications from B5-B1. Similarly, values $y_1$–$y_6$ of column 306 (labeled B5-B2) represent the values of data fields 308–318, respectively, for handoffs and verifications from B5-B2. Database 320 includes data fields 308–318 for all other possible combinations and directions for handoff between base stations under the control of MSC1. The verification processor and database for performing adaptive mobile stations presence verification between a base station under control of MSC1 and a base station under control of another MSC may be located in either one of the separate MSCs.

The data field H 316 for each handoff direction is calculated as:

$$H = \frac{NH_oU}{NH_oA}$$

The data field V 318 for each verification direction is calculated as:

$$U = \frac{NV_eU}{NV_eA}$$

For each requested handoff, the verification processor monitors the flow of handoff signals between the target base station and serving base station. When a handoff request is received indicating a target base station, a determination is made in verification processor 300 as to whether a mobile station presence verification is to be performed. The determination is made based on a calculated rate (V) of verification attempts per requested handoff from the serving cell to the target cell. V may be calculated from the values H and U for requested handoffs from the serving base station to the target base station. V may be calculated as a function $$V = f(H,U)$$

The function $f(H,U)$ may be chosen as desired by the system operator.

Figure 4A:
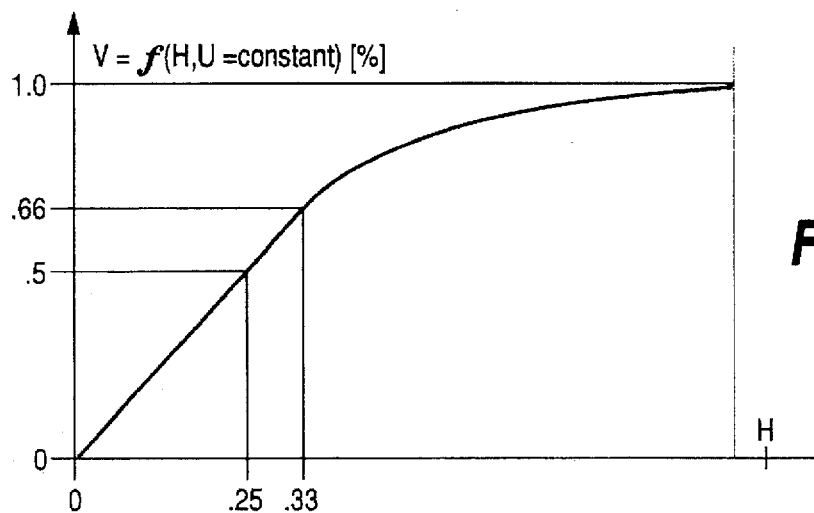
FIGS. 4A–4C are graphical illustrations showing possible functions for determining the rate of mobile station presence verification per requested handoffs, according to an embodiment of the invention.
Figure 4B:
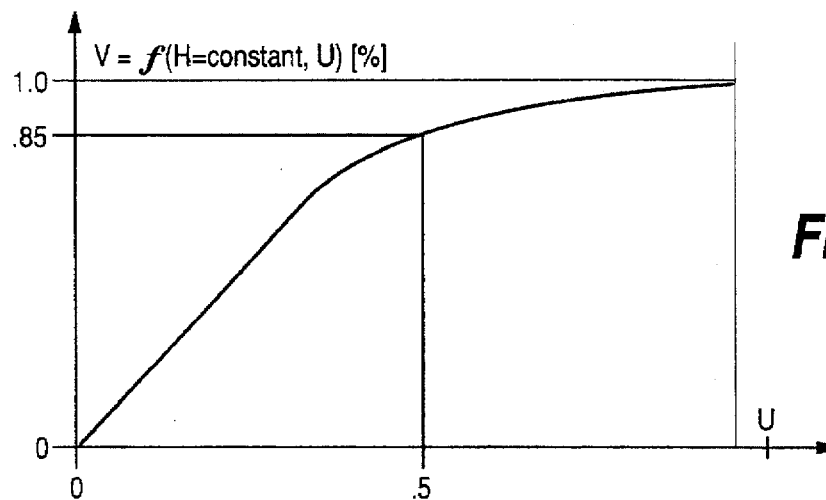
Figure 4C:
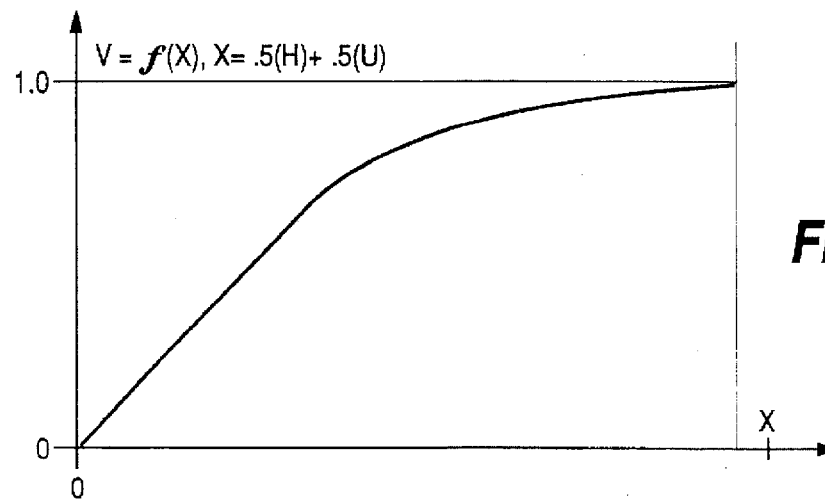

Referring now to FIGS. 4A, 4B and 4C, therein are graphically shown examples of possible functions for $f(H, U)$. In FIG. 4A, $f(H,U)$ is defined to be a function of the value of the rate of unsuccessful handoff attempts (H) only, with U set to a constant, i.e., $f(H,U)=f(H)$. For an embodiment using this function it is only necessary to collect the data fields $NH_oA$ 308 and $NH_oU$ 310 and to only calculate H 316 for database 320. For this function, $f(H)$ increases as the rate of unsuccessful handoff attempts H increases, and mobile station presence verifications will be performed at a an increasing rate. For example, if H=0.25, $f(H)$=0.5, and one mobile station presence verification will be performed for every two incidences of requested handoff between the serving base station and target base station. If H=0.33, then $f(H)$=0.66, and two verifications are performed for every three incidences of requested handoff.

In FIG. 4B $f(H,U)$ is defined to be a function of the value of the rate of unsuccessful verifications U only, with H set to a constant, i.e., $f(H,U)=f(U)$. For an embodiment using this function it is only necessary to collect the data fields $NV_eA$ 312, $NV_eU$ 314 and to only calculate U 318 for database 320. For this function, $f(U)$ increases as the number of unsuccessful handoff attempts U increases and mobile station presence verification will be performed at an increasing rate. For example, if U=0.5, ƒ(U)=0.85, and sixteen verifications will be performed for every twenty incidences of requested handoff from the serving base station to the target base station. If U=1, ƒ(u)=1, and a verification is performed for every requested handoff.

In FIG. 4C ƒ(H,U)= is defined to be a function ƒ(x), where x=0.5H+0.5U. In this function the values U and H are equally weighted to determine ƒ(x). The value ƒ(x) determines the rate of verifications in a manner similar to that described for ƒ(H) or FIG. 4A and ƒ(U) of FIG. 4B.

One skilled in the are will recognize that the functions performed by the apparatus of FIG. 3 may also be implemented within software or in varying combinations of hardware and software.

Figure 5:
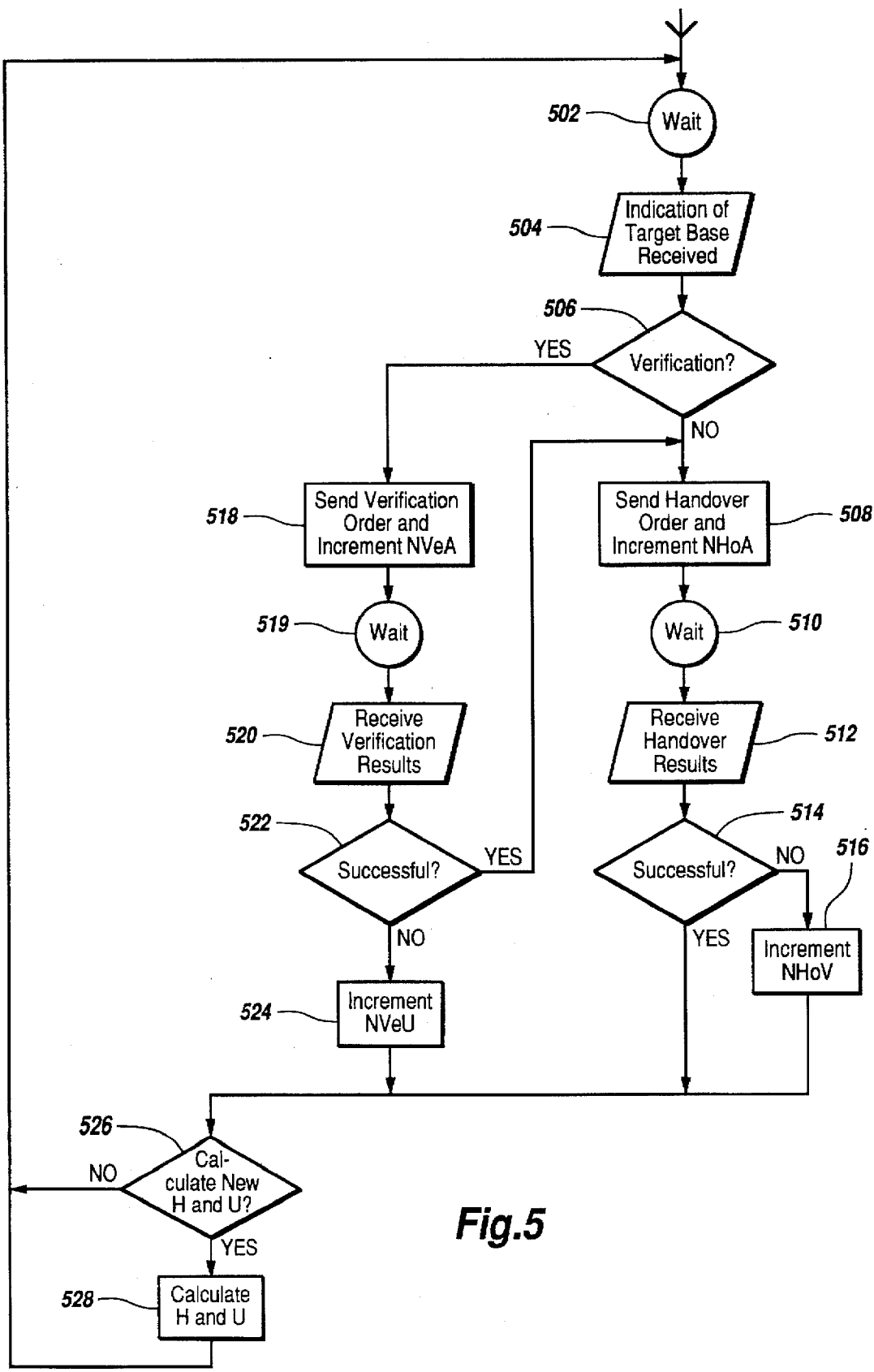
FIG. 5 is a flow diagram showing process steps performed in adaptive mobile station presence verification according to an embodiment of the invention.

Referring now to FIG. 5, therein is illustrated a flow diagram showing process steps performed in adaptive mobile station presence verification for a requested handoff according to an embodiment of the invention. In the embodiment shown in FIG. 4, a function V=ƒ(H,U) where V is dependent on both H and U is used.

When initiated, the process moves to the wait state of Step 502. The process remains in the wait state until a handoff request message containing the identity of a target base station is received from a serving cell at Step 504. Next, at Step 506, a determination is made in verification circuitry 300 as to whether a mobile station presence verification is to be performed by the target base station. The determination is made by calculating V=ƒ(H,U) from the present values of H 316 and U 318 in database 320.

If it is determined at Step 506 that a mobile station presence verification is not to be performed, the process moves to Step 508. At Step 508 verification circuitry 300 invokes the MSC to order a handoff attempt (without a verification) and increments NHoA in database 320. The process then moves to the wait state at Step 510. Next, at Step 512, an indication of the handoff attempt results is received by verification circuitry 300. The process then moves to Step 514 where a determination is made by verification circuitry 300 as to whether the handoff attempt was successful.

If, at Step 514, it is determined that the handoff attempt was unsuccessful, the process moves to Step 516. At Step 516 verification circuitry 300 increments the value for the number of unsuccessful handoff attempts ($NH_oU$) from the serving base station to the target base station. The process then moves to Step 526. If, however, at Step 514, it is determined that the handoff attempt was successful, the process moves to Step 526 without incrementing $NH_oU$.

At Step 526 a determination is made in verification circuitry 300 as to whether new values should be calculated for H and U for requested handoffs from the serving cell to the target cell. New values of H and U may be calculated for every occurrence of requested handoff in which the target cell is designated as a target cell from the serving cell, or once for every predetermined number of occurrences of requested handoff. For example, H and U may be recalculated once every twenty times that the target cell is designated in a requested handoff from the serving cell. The data fields $NH_oA$, $NH_oU$, $NV_eA$ and $NV_eU$ may or may not be cleared in database 320 for each new calculation of H and U. The calculation of V may also be performed as a time average, i.e., over a predetermined period of time, with the data fields being cleared to zero at the beginning of the time period. One skilled in the art will be capable of designing circuitry such as verification circuitry 300 capable of performing such functions.

If, at Step 526, it is determined that new H and U values are to be calculated, the process moves to Step 528 and new H and U values are calculated by verification circuitry 300 and written into database 320. The process then moves back to the wait state of Step 502. If, however, at Step 526, it is determined that new H and U values are not to be calculated, the process moves back to the wait state of Step 502 without calculating new H and U values.

Referring again to decision Step 506, if, however, at Step 506, it is determined in verification circuitry 300 that a mobile station presence verification is to be performed, the process moves to Step 518. At Step 518 verification circuitry 300 invokes the MSC to order a verification attempt and increments $NV_eA$ in database 320. The process then moves to the wait state of Step 519. Next, at Step 520, an indication of the verification attempt results is received. The process then moves to Step 522 where a determination is made in verification circuitry 300 as to whether the verification attempt was successful.

If, at Step 522, it is determined that the verification attempt was successful, the process moves to Step 508. Steps 508, 510, 512, 514, 516, 526 and 528 are then performed, each as previously described, and the process returns to the wait state of Step 502. If, however, at Step 522, it is determined that the verification was unsuccessful, the process moves to Step 524. At Step 524 verification circuitry 300 increments the value $NV_eU$ for verifications from the serving base station to the target base station. The process then moves to Step 526. Steps 526 and 528 are then performed, each as previously described and the process returns to the wait state of Step 502.

It is believed that the operation and construction of the present invention will be apparent from the foregoing description and, while the invention shown has been characterized as a particular embodiment, changes and modifications may be made therein without departing from the spirit and scope of the invention as defined in the following claims.

What is claimed is:

1. In a mobile telecommunication system comprising at least one mobile station and, a fixed network comprising a plurality of base stations and at least one mobile switching center, each of said base stations having a coverage area and capable of communicating with said at least one mobile station while said at least one mobile station is located in said coverage area, an apparatus for adaptively verifying the presence of said at least one mobile station within the coverage area of a first base station during requested handoffs of communications from a second base station to the first base station, verification of the presence of the mobile station made responsive to a verification attempt, said apparatus comprising:

a memory device for storing a database comprising a first data value, said first data value indicative of the rate of unsuccessful verification attempts per verification attempt from the second base station to the first base station; and verification circuitry for calculating a second data value, said second data value calculated as a function of said first data value, for recalculating said first data value subsequent to every at least one requested handoff, and for recalculating said second data value subsequent to selected requested handoffs, and for determining, based on said second data values, if the verification attempt is to be performed for a particular requested handoff from the second base station to the first base station.

2. In a mobile telecommunications system comprising at least one mobile station and a fixed network comprising a plurality of base stations and at least one mobile switching center, each of said base stations having a coverage area and capable of communicating with said at least one mobile station while said at least one mobile station is located in said coverage area, a method of adaptively verifying the presence of said at least one mobile station within the coverage area of a first base station during requested handoffs of communications from a second base station to the first base station, said method comprising the steps of:

receiving, in said fixed network, an indication that the first base station has been chosen as a handoff target; and determining if a verification is to be performed by the first base station by storing a plurality of data values at a database, the data values stored at the database including a first data value indicative of the rate of unsuccessful verifications per verification attempt from the second base station to the first base station, calculating a second data value, the second data value calculated as a function dependent on said first data value, and then determining if said second value indicates that a verification is to be performed.

3. The method of claim 2 further comprising, in response to a positive determination in said step of determining that the verification is to be performed, the steps of:

sending a verification order to the first base station ordering a verification attempt;

receiving an indication of the results of said verification attempt; and recalculating said second data value responsive to said indication of the results.

4. The method of claim 2 further comprising, in response to a positive determination in said step of determining that the verification is to be performed, the steps of:

sending a verification order to the first base station ordering a verification attempt;

receiving an indication of the results of said verification attempt; and recalculating said first data value responsive to said indication of the result of said verification attempt.

5. The method of claim 4 further comprising the steps of:

determining if said verification was successful;

and, in response to a positive determination in said step of determining if said verification was successful:

sending a handoff order to said second base station ordering a handoff attempt;

receiving an indication of the result of said handoff attempt; and recalculating said second data value responsive to said indication of the result of said handoff attempt.

6. The method of claim 5 further comprising the steps of:

recalculating said third data value using said recalculated first data value recalculated in said step of recalculating said first data value and, said recalculated second data value recalculated in said step of recalculating said second data value.

7. In a mobile telecommunications system comprising at least one mobile station and, a fixed network comprising a plurality of base stations and at least one mobile switching center, each of said base stations having a coverage area and capable of communicating with said at least one mobile station while said at least one mobile station is located in said coverage area, an apparatus for adaptively verifying the presence of said at least one mobile station within the coverage area of a first base station during requested handoffs of communications from a second base station to the first base station, said apparatus comprising:

a memory device for storing a database comprising a first data value and a third data value, said first data value indicative of the rate of unsuccessful handoff attempts per handoff attempt from the second base station to the first base station and said third data value indicative of the rate of unsuccessful verification attempts per verification attempt from the second base station to the first base station; and verification circuitry for calculating a second data value, said second data value calculated as a function of said first data value, for recalculating said first data value subsequent to every at least one requested handoff and recalculating said second data value subsequent to selected requested handoffs, for determining, based on said second data values, if a verification attempt is to be performed for a particular requested handoff from the second base station to the first base station, and for recalculating said third data value subsequent to every said at least one requested handoff.

8. In a mobile telecommunications system comprising at least one mobile station and, a fixed network comprising a plurality of base stations and at least one mobile switching center, each of said base stations having a coverage area and capable of communicating with said at least one mobile station while said at least one mobile station is located in said coverage area, an apparatus for adaptively verifying the presence of said at least one mobile station within the coverage area of a first base station during requested handoffs of communications from a second base station to the first base station, said apparatus comprising:

a memory device for storing a database comprising a first data value, said first data value based on the history of results of requested handoffs from the second base station to the first base station; and verification circuitry for calculating a second value, said second data value calculated as a function of said first data value, said second data value indicative of the rate of verification attempts to be performed per requested handoff from the second base station to the first base station, for recalculating said first data value subsequent to every at least one requested handoff, and for recalculating said second data value subsequent to selected requested handoffs, and for determining, based on said second data values, if a verification attempt is to be performed for a particular requested handoff from the second base station to the first base station.

9. In a mobile telecommunications system comprising at least one mobile station and a fixed network comprising a plurality of base stations and at least one mobile switching center, each of said base stations having a coverage area and capable of communicating with said at least one mobile station while said at least one mobile station is located in said coverage area, a method of adaptively verifying the presence of said at least one mobile station within the coverage area of a first base station during requested handoffs of communications from a second base station to the first base station, said method comprising the steps of:

receiving, in said fixed network, an indication that the first base station has been chosen as a handoff target; and determining if a verification is to be performed by the first base station by storing first and second data values at a database, said first data value indicative of the rate of unsuccessful verifications per verification attempt from the second cell to the first cell, said second data value indicative of the rate of unsuccessful handoff attempts from the second base station to the first base station, by calculating a third value, said third data value calculated as a function dependent on said first and second data values, and then determining if said third data value indicates that a mobile station presence verification is to be performed.

* * * * *